United States Patent [19]

Croom, Jr. et al.

[11] 4,413,516

[45] Nov. 8, 1983

[54] OIL WELL SERVICE TOOL

[75] Inventors: Robert E. Croom, Jr., Lafayette; John D. Jeter, St. Martinville, both of La.

[73] Assignee: Oil-Well Drilling Control, Inc., Broussard, La.

[21] Appl. No.: 360,108

[22] Filed: Mar. 19, 1982

[51] Int. Cl.³ .............................................. G01D 11/24
[52] U.S. Cl. ........................................ 73/431; 33/304; 73/151
[58] Field of Search ................ 33/302, 304–314; 73/151, 430, 431

[56] References Cited

U.S. PATENT DOCUMENTS

| | | | |
|---|---|---|---|
| 1,960,038 | 5/1934 | Williston et al. | 33/313 |
| 2,819,537 | 1/1958 | Peebles | 33/311 |
| 3,653,468 | 4/1972 | Marshall | 73/151 |
| 4,141,153 | 2/1979 | Nelson | 33/302 |

*Primary Examiner*—S. Clement Swisher
*Attorney, Agent, or Firm*—John D. Jeter

[57] ABSTRACT

Apparatus for reducing landing shock for instruments run into earth boreholes through drill string bores and to maintain azimuthal orientation being protected with enclosing structure. An instrument package has a depending spear point for engaging a baffle in the drill string. The spear point encloses a spring and fluid damped shock absorber. The instrument package further includes a second internal fluid damped shock absorber and a spring type rotary shock absorber for the measuring instrument.

10 Claims, 4 Drawing Figures

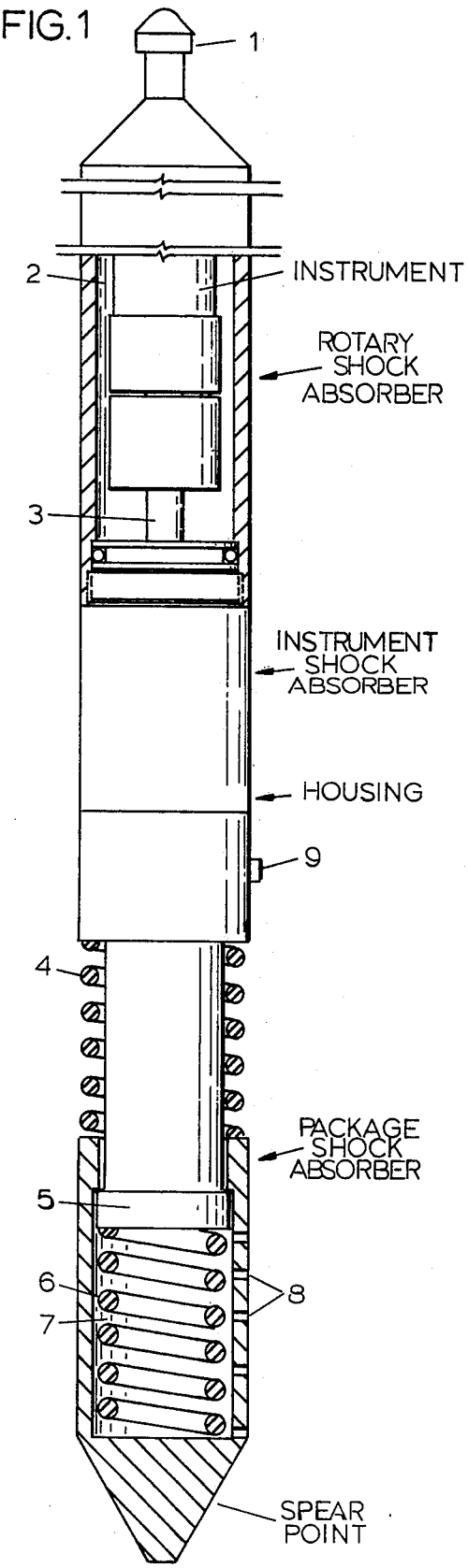
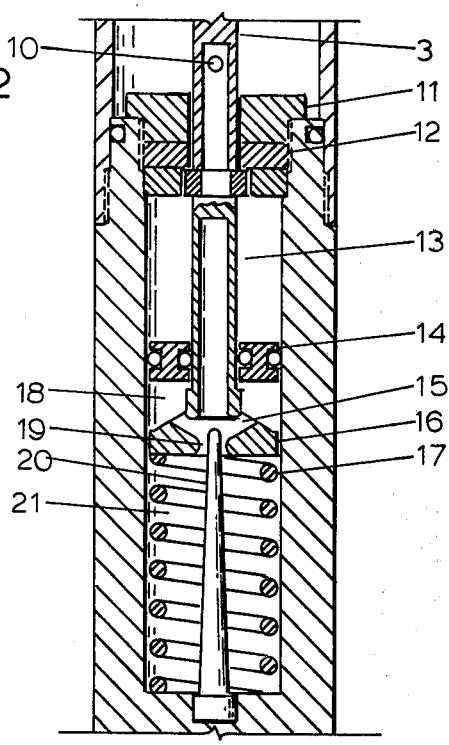
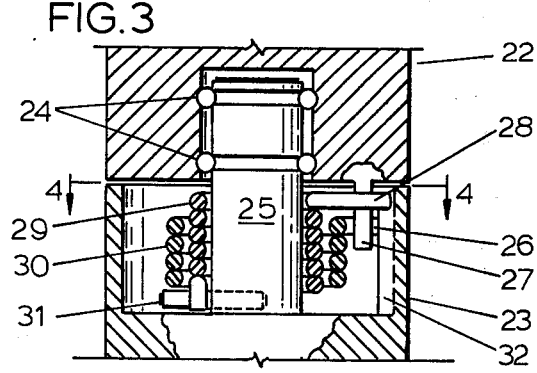
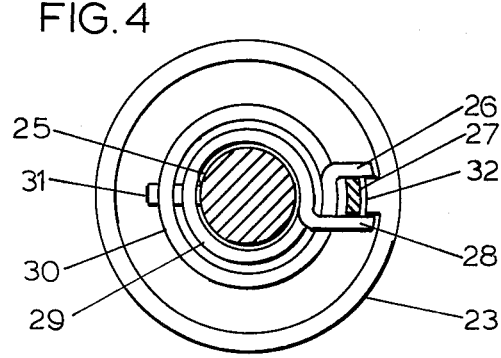

OIL WELL SERVICE TOOL

This invention pertains to well survey instrumentation and means to protect such instrumentation from the shock of deceleration and rotation when arriving at the point of use after being lowered, dropped, or pumped down into a drill string bore.

BACKGROUND

In directing the course of earth boreholes so that a borehole proceeds during drilling such as to arrive at the planned depth with a preferred location downhole relative to the starting point, survey instruments are commonly used. Usually the instruments are housed in a torpedo-like package, and the package is usually dropped down the drill string at the earth surface. The package descends about one thousand feet per minute in a fluid filled pipe to be stopped by a pipe bore restriction near the drill bit. The package is usually recovered when the drill string is removed from the hole. It can be recovered by a wire line down the pipe bore.

The instruments commonly consist of means to sense and to record the relationship of the instrument to the earth's gravity vector and the earth's magnetic field. Apparatus is commonly provided to position the instrument, once downhole, with a specific relationship to the drill string centerline, and sometimes to a specific radial plane of the drill string. By this process, the relationship of the drill string to the earth gravity and magnetic field vectors can, in turn, be established. To protect the instrument from hydrostatic pressure and geothermal heat, a housing is provided that is sealed and capable of containing the instrument. The housing, with its fittings and contents, is often called a survey instrument package. The housing must be of such diameter that it will pass through all restrictions encountered in the drill string bore through which it passes in going from the earth surface to the downhole location, commonly established by a restriction near the drill bit at the lower end of the drill string that the housing will not go through. Azimuthal orientation is usually accomplished by a cam arrangement known as a muleshoe and an indexing pin that engages the muleshoe. The muleshoe can be either on the instrument housing or the drill string bore as long as the indexing pin is on the other. Such systems are in widespread use and broadly found in well drilling related literature.

EXISTING PROBLEM

Partly because of the diametral limitations of the instrument package and partly because of the nature of gravity and magnetic field sensing devices, the instruments in use are rather delicate and subject to shock damage.

Shock occurs when the moving instrument package arrives downhole and is suddenly stopped by the bore restriction used to position the instrument for survey work. An instrument package dropped down a drill string bore moves downward through the usual fluid in the bore at a speed in the order of one thousand feet per minute. Springs are used on both the housing and the enclosed instrument to cushion the shock of the sudden stop. The travel of these springs is necessarily limited. If the springs are strong enough to store the velocity energy to avoid bottoming out with a serious shock, they may rebound and hit upper limit stops with a shock almost as serious as the sudden stop would have been without springs. To counter this rebound shock, pieces of rubber inserted in the springs have been used in rebound control efforts. Rubber does consume more energy in flexing than steel springs, but damage still occurs.

Complicating initial and rebound shock controls is the necessity to retain rotational relationships between instrument and housing.

Design considerations limit the amount of travel available for shock absorber systems. The use of dashpots with fixed fluid control channels fails to minimize shock loads. Such channels are velocity responsive and cause deceleration forces to be high at initial impact and decay to zero along with velocity.

Apparatus is needed that will produce a uniform deceleration over the available deceleration distance.

Attending the axial shock of deceleration is a rotational shock due to the forced orientation of the instrument relative to the drill string. The instrument package hits the muleshoe before deceleration at speeds up to thirty feet per second. The maximum forced turn of the instrument is 180°. This can result in a rotational rate of eighteen hundred rpm. This rotational orientation can occur in a six inch travel distance, but the rotation rate may be achieved in less than one inch of travel, or 0.00278 seconds, and this rate depends upon sufficient resilience of the structure to allow thirty degrees of structural twist to be permitted by the resilience. The rotation just as suddenly stops once rotational alignment is achieved. This rotational shock has been withstood rather well by conventional survey instruments, but instruments are evolving into more electronic contrivances involving elements not naturally resistant to such treatment. In other words, elements are now being assembled especially for this kind of service as before, but some of the components are built for the usual electronic industry and cannot be conveniently modified for rugged service. Such devices as sensitive accelerometers are currently built to accept only limited acceleration force vectors transverse those they are designed to sense. Rotational shock now demands attention.

OBJECTS

Therefore, it is an object of this invention to produce apparatus to provide uniform deceleration forces over the deceleration run of an earth borehole downhole instrument upon termination of transport from the earth surface to downhole locations.

It is another object of this invention to provide apparatus to maintain azimuthal relationship between a downhole survey instrument and its housing during the deceleration run and recovery from deceleration in a downhole survey instrument assembly.

It is yet another object of this invention to provide rotational shock damping to reduce rotational shock transmitted to a downhole survey instrument as a survey package is rotated for indexing with a drill string radial plane upon arrival at a downhole location.

These and other objects, advantages, and features of this invention will be apparent to those skilled in the art from a consideration of this specification, including the attached drawings and appended claims.

BRIEF DESCRIPTION OF DRAWINGS

FIG. 1 is a plan view in partial cutaway of the overall instrument package;

FIG. 2 is a plan view somewhat enlarged in partial cutaway of the inner instrument shock absorber portion of the device of FIG. 1;

FIG. 3 is a plan view somewhat enlarged of the rotary shock absorber of the device of FIG. 1; and FIG. 4 is a view of section 4—4 of the device of FIG. 3.

DETAILED DESCRIPTION OF DRAWINGS

The instrument package is normally dropped into a pipe bore in the configuration of FIG. 1, and travels to the bottom without change. As the package nears the location for survey work, the lug engages a rotational orientation cam known as a muleshoe and is forced to rotate the package to a particular rotational position relative to the drill string and the downhole assembly. The radial line of interest is usually called the tool face. Element 1 is an overshot spear often used to connect the package to a wireline for retrieval or lowering of the package.

A baffle (not shown) is normally placed in the drill string near the bit to stop the downward movement of the package. The spear point end enters the baffle bore, but the bore is too small for the package to pass through. The spear point is suddenly stopped. The package may be moving downward at speeds up to thirty feet per second. To reduce deceleration shock to the package, the spear point telescopes upward against the bias of springs 4 and 6. To consume velocity energy not stored in the springs, piston 5 moves downward displacing drilling fluid from cavity 7. The cavity is not sealed and will fill with drilling fluid during the trip downhole. The fluid displaced by the piston is forced out holes 8 in the wall of the spear point.

The rate of fluid flow through an orifice behaves approximately according to the equation $Q = AE\, 2GH$, where Q equals the quantity of fluid discharged per unit time, A equals the area of the orifice, E equals the orifice efficiency, G equals the acceleration of gravity, and H equals the pressure head causing the flow. The fluid pressure H acts on piston 5 to absorb velocity energy, and the velocity of the package is reduced. it can be seen from the equation above that as the velocity of the package and Q are reduced, to maintain a uniform deceleration pressure, the area of the flow controlling orifice must be reduced. To reduce the orifice area, holes 8 are distributed along the travel path of the piston. As the piston passes each hole, the area of the hole is reduced from the total flow area of the plurality of holes. This does not produce a uniform deceleration pressure, but a reasonable average pressure is maintained in cavity 7. A reasonably uniform deceleration of the upper package is produced by the action of the pressure on piston 5.

When the package velocity energy is dissipated or stored in springs 4 and 6, the springs urge the package upward to some preselected position as determined by spring bias and upper package weight.

The instrument to be protected is in sealed cavity 2.

The instrument shock absorber is shown somewhat enlarged in the partial cutaway of FIG. 2. The orienting rod 3 is attached to the lower end of the rotational shock absorber, and the upper end of the orienting rod 3 is shown in FIG. 2. The orienting rod is normally hexagonal in cross section and is free to slide axially through a mating hexagonal bore in guide 12.

During deceleration the weight of all instruments and the rotational shock urges rod 3 to move downward. Rod 3 is pinned by pin 10 to rod 13, and rod 13 and piston 16 move downward. Piston 16 displaces fluid from cavity 21 and compresses spring 17.

Fluid displaced from cavity 21 flows through the annular opening between orifice 19 and throttle rod 20. The displaced fluid flows out piston channels 15 into cavity 18, moving the separator piston 14 upward. Ambient air is commonly above piston 14 as well as in cavity 2.

According to the previous equation for fluid flow through an orifice, a pressure is created in cavity 21 as controlled by the flow area between the throttle rod 20 and orifice 19. The pressure acting on piston 16 absorbs velocity energy and reduces the downward velocity of the instrument. To maintain a uniform retarding pressure in cavity 21, the throttle rod 20 is tapered. This taper is shaped to reduce the flow area between orifice 19 and rod 20 at a rate that corresponds to the velocity remaining in the instrument resulting in a deceleration force.

When downward velocity reaches zero, spring 17 urges the piston 16 and all sympathetic elements upward to the starting point. Fluid in cavity 18 returns by channels 15 to cavity 21.

The rotational shock absorber of FIG. 3 is attached by means not shown to the top of rod 3 of FIG. 2. The rotational shock absorber is necessary because the speeding package is suddenly rotated by lug 9 of FIG. 1, hitting the orienting muleshoe. The package is rapidly rotated toward planned rotational orientation before axial deceleration is effective. Some instruments should not be subject to such rotational acceleration.

Since the common muleshoe rotates a descending package no more than 180° but may do so in either direction, the rotational shock absorber needs only accept 180° of turn in each direction.

During the descent of the package down a pipe bore, parts 22 and 23 of FIGS. 3 and 4 are in the positions shown. Springs 29 and 30 are helical in form and wound for bias in opposite rotational directions. Spring ends 26 and 28 are against limit stop 32, and orienting tang 27 is captured between the spring ends, aligning tang 27 and stop 32.

When the package strikes the muleshoe and rotates element 23, element 27, which is attached to the instrument, is urged to rotate only by the bias of one spring since it can rotate freely on bearing set 24.

Element 23 may be rotated as much as 180°, and tang 27 will pull one of the springs away from stop 32 as the stop rotates in unison with element 23. Both springs are anchored to element 23 by pin 31.

The displaced spring will urge tang 27 back to the displaced limit stop at an acceptable rate. When the tang reaches the position of the limit stop, it will have some rotational speed and will move the second spring some rotational distance before being urged back to the limit stop. There may be several excursions past the limit stop before the rotational energy of the instrument is dissipated, but the two springs will eventually align tang and limit stop.

The path of rotational control passes from the muleshoe to lug 9 of FIG. 1 to guide 12 of FIG. 12, orienting rod 3 of FIGS. 1 and 2, and element 23 of FIG. 3, and finally tang 27 by way of springs 29 and 30 and limit stop 32. The instrument is then rotationally aligned with the tool face of the lower drill string assembly.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. In a well bore survey instrument package to be lowered into and retrieved from a pipe bore situated in an earth bore hole, shock damping apparatus to reduce shock to an instrument contained within the package comprising:
   an enlongated generally cylindrical housing having an upper and a lower end, a sealed enclosure, and a generally central longitudinal axis;
   a well bore survey instrument situated in said enclosure, mounted for axial movement from a first upper position to a second lower position along said central axis;
   a fluid filled dashpot cylinder interposed between said housing and said instrument, situated for telescoping movement along said central axis from said first position to said second position in sympathy with axial movement of said instrument;
   means to force fluid movement from at least part of said dashpot cylinder in reponse to telescoping movement;
   a variable area flow restriction means to regulate flow of fluid from said dashpot cylinder in response to telescope position of said dashpot;
   means responsive to the telescope position of said dashpot to vary the area of said flow restriction;
   a variable volume container means in communication with said dashpot to receive, contain, and return fluid moving from and back to said dashpot; and
   bias means to return said instrument and said dashpot to the first upper position;
   whereby the change in velocity of an instrument may be controlled to distribute acceleration forces evenly over the acceleration run to minimize peak acceleration forces imposed upon the instrument.

2. In an earth borehole survey instrument package movable through a pipe bore from the earth surface to a restraining device at a downhole location, apparatus to reduce the deceleration rate of instruments in the package comprising:
   an elongated generally cylindrical housing with a sealed enclosure, a lower and an upper end, and longitudinal central axis;
   a piston and cylinder pair attached to said housing lower end situated for relative motion of said piston in said cylinder in response to downward force applied by said housing and resisted by the downhole locating device;
   a fluid body subject to fluid discharge in sympathy with said piston and cylinder relative motion;
   an orifice in communication with said fluid body comprising a plurality of holes through the wall of said cylinder, distributed along a dimension traversed by said piston relative motion to change the number of holes subject to said fluid discharge in sympathy with said piston position relative to said cylinder;
   an instrument within said sealed enclosure situated for axial motion relative to said housing;
   a piston and cylinder pair situated in said enclosure for axial relative motion in sympathy with movement of said instrument with force communication means to said instrument and one of said pair, and force communications means to said housing and the other of said pair;
   a fluid filled body situated within said cylinder and piston pair arranged to discharge fluid from said body in response to piston and cylinder relative motion;
   an orifice in communication with said fluid body through which said fluid may flow; and
   a tapered rod situated to extend into said orifice in sympathy with relative motion of said piston and cylinder;
   whereby the deceleration forces imposed upon the housing by the dashpot effect of the cylinder and piston on the lower end of the housing may be regulated over the travel distance of the housing relative to the pipe bore location device during deceleration after travel through the pipe bore, the internal piston and cylinder arrangement serving a similar function to further protect the instrument from deceleration forces acceptable to the housing.

3. The apparatus of claim 2 further provided with rotational shock control means comprising a bearing supported rotating pair structurally situated between said instrument and said housing to permit said instrument to rotate relative to said housing whereby rotational shock administered to said housing will not be fully transmitted to said instrument.

4. The apparatus of claim 3 further comprising at least one limited travel bias responsive to the relative rotation of instrument and housing situated to urge said instrument to return to and remain in a preselected orientation relative to said housing.

5. The apparatus of claim 2 further comprising bias means responsive to relative motion between said cylinder and piston pair on the housing lower end to urge said pair to a position existing prior to displacement.

6. The apparatus of claim 2 further comprising bias means responsive to relative axial motion between said piston and cylinder pair between housing and instrument to urge said pair to a position existing prior to displacement.

7. In a well bore survey package to be lowered into a borehole with shock of deceleration upon reaching the selected survey position downhole, apparatus to reduce peak deceleration loads imposed upon delicate instruments within the descending package comprising:
   an elongated housing having a sealed enclosure and a generally central axis;
   a well survey instrument situated in said enclosure mounted for movement along said axis from a first position to a second position;
   a collapsible cylinder with a fluid filled enclosure made smaller by collapsing said cylinder from a first extended position to a second collapsed position, said collapse in sympathy with movement of said instrument from said first to said second position;

a variable resistance fluid escape means for fluid to move out of said fluid filled enclosure upon collapse of said cylinder;

control means to regulate said resistance to fluid escape responsive to the position of said instrument relative to said first and second positions;

bias means to urge said instrument from said second position to said first position;

means to convey deceleration loads from said instrument to said cylinder; and means to convey deceleration loads from said cylinder to said housing;

whereby the shock of suddenly stopping the housing from movement through a pipe bore will be transmitted to the instrument at a reduced deceleration rate by allowing the velocity energy of the instrument to be distributed with reasonable uniformity over the travel of the instrument and collapsable cylinder as they move axially within the sealed enclosure.

8. In an instrument package used to measure physical factors in earth boreholes by being moved from the earth surface down the bore of the pipe string in the earth borehole to a preselected position in the pipe bore for measurement activity apparatus to reduce the acceleration loads imposed upon instruments contained within the package comprising:

an elongated generally cylindrical housing having an upper end and a lower end, a sealed enclosure, and a longitudinal centerline; shock absorber means at the lower end of the housing to reduce the acceleration rate of the remainder of the package when the package is accelerated by velocity change in moving through the pipe bore;

acceleration control means in said shock absorber to apply a reasonably uniform acceleration force to the package as velocity is changed over the acceleration travel distance;

means inside the package enclosure to allow movement of the instrument a distance along said central axis to provide an acceleration travel distance to said housing;

shock absorber means associated with said movement means to apply retarding forces to the instrument as it moves along said central axis;

shock absorber control means responsive to the amount of movement of the instrument along said axis to regulate the acceleration forces to a reasonably constant value;

bias means to return the instrument to a preselected position within the enclosure after the acceleration movement; and bias means to return the package to a preselected axial position after the acceleration movement;

whereby the package and instrument are protected from sudden acceleration when the package velocity through the pipe bore is changed.

9. The apparatus of claim 8 further comprising means to permit controlled relative rotation between package housing and the contained instrument and bias means to rotationally orient the instrument to a preselected rotational position relative to the housing.

10. The apparatus of claim 9 further comprising rotational bias means to return the instrument to a preselected orientation relative to the housing.

* * * * *